Patented Sept. 7, 1954

2,688,607

UNITED STATES PATENT OFFICE 2,688,607

MODIFIED MELAMINE RESIN AND PROCESS FOR PREPARING THE SAME

Tzeng Jiueq Suen, Stamford, Conn., assignor to American Cyanamid Company, New York, N. Y., a corporation of Maine No Drawing. Application December 11, 1951, Serial No. 261,154

19 Claims. (Cl. 260—67.6)

This invention relates to water soluble melamine-formaldehyde resins modified with an organic aminosulfuric acid compound and the process of preparing the same. This invention further relates to water-soluble melamine-formaldehyde resins modified by an aminosulfuric acid compound having the formula:

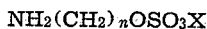
$$NH_2(CH_2)_nOSO_3X$$

wherein $n$ is a whole number between 1 and 6, inclusive, and X is a radical selected from hydrogen, potassium, sodium, lithium, $NH_4$, and hydrogen in combination with water soluble tertiary amines.

The object of the present invention is to prepare water soluble melamine-formaldehyde resins modified by aminosulfuric acid compounds which are utilizable in the preparation of wet strength papers. A further object of the present invention is to produce water soluble melamine resins which are utilizable in the crease-proofing and shrink-proofing of textile materials and in the treatment of leather. A further object of the present invention is to produce modified melamine resins which are adaptable for use as adhesive materials. These and other objects will be discussed more fully hereinbelow.

In the preparation of the melamine resins of the instant invention, one may react melamine and the formaldehyde as the first stage of the reaction, subsequently adding the aminoalkylsulfuric acid compound and heating the reaction materials at temperatures up to reflux until a water soluble product is obtained which is stable at room temperatures without precipitation or coagulation.

The process may be modified in a number of ways. For instance, the three reacting components may be introduced into a suitable reaction chamber and heated at elevated temperatures within the range of about 45–100° C. at a pH of 4–11 but preferably at a pH of about 6–8 until a water soluble product is obtained which is stable at room temperatures without precipitation or coagulation. These and other modifications of the reaction process will be obvious to those skilled in the art, and it is intended that each of these modifications be included within the scope of the claims set forth hereinbelow.

In order that the invention be more completely understood, the following detailed examples are set forth for the purpose of illustration only and are not to be interpreted as a limitation on the case except as indicated by the appended claims. All parts are parts by weight. pH determinations are by glass electrode at 25° C.

EXAMPLE 1

243 parts of a 37% aqueous solution of formaldehyde (3 mols) are introduced into a suitable reaction chamber and the pH of the solution is adjusted to 3.9 with dilute sodium hydroxide, thereafter 126 parts of melamine (1 mol) is added and the two reactants are mixed together and heated to 80–85° C. The reaction mixture is maintained at this temperature for about 25 minutes, and is then cooled to about 50° C. A mixture of 17 parts of 2-aminoethylsulfuric acid (0.12 mol) and 57.7 parts of a 10% aqueous solution of sodium hydroxide are added. The pH of the reaction mixture is then about 10.9. The reaction is allowed to continue at 60–65° C. for about 30 minutes whereupon it is cooled to room temperature. The product is completely miscible with water.

EXAMPLE 2

126 parts of melamine (1 mol) is added to 243 parts of a 37% aqueous solution of formaldehyde (3 mols), the pH of which has been adjusted to about 4 with dilute sodium hydroxide before the melamine is added. The pH of the slurry after the mixing of the two components is about neutral. The mixture is then heated to about 80° C. and maintained at 80–85° C. for about 20 minutes. It is then cooled to 65° C. and a solution of 11.3 parts of 2-aminoethylsulfuric acid (0.08 mol) and 31.7 parts of triethanolamine in 60 parts of water is added. The pH of the mixture is 7.7. The reaction is allowed to continue at about 60° C. for 15 minutes, thereafter the syrup is cooled to room temperature. The resultant product is completely miscible with water.

EXAMPLE 3

Example 2 is repeated except a solution of about 34 parts of 2-aminoethylsulfuric acid (0.24 mol) and 13.8 parts of sodium hydroxide in 85.3 parts of water is added. The pH is then about 10.8. The reaction is continued at 60–70° C. for about 30 minutes. The resultant product has a pH of about 7.6 and is completely miscible with water.

EXAMPLE 4

Example 3 is repeated except that the modifier consists of a solution of 7.5 parts of 2-aminoethylsulfuric acid (0.05 mol) in 24.4 parts of a 10% aqueous solution of sodium hydroxide. At the conclusion of the reaction, the resultant product has a pH of about 8 and is soluble in water.

EXAMPLE 5

126 parts of melamine (1 mol) and 324 parts of a 37% aqueous solution of formaldehyde (4 mols) are mixed together. The pH of the slurry is adjusted to about 7.2 with a dilute solution of sodium hydroxide. The reaction mixture is then heated to reflux and maintained at that temperature for about 35 minutes, whereupon it is cooled to 65° C. A mixture of 14.1 parts of 2-aminoethylsulfuric acid (0.1 mol) in 49 parts of a 10% aqueous solution of sodium hydroxide is added. The pH of the solution is then about 10.5. The reaction is continued at about 60–65° C. for approximately 30 minutes. The resultant product has a pH of 8.0 and is infinitely soluble in water.

EXAMPLE 6

405.5 parts of a 37% aqueous solution of formaldehyde (5 mols) and 0.49 parts of a 10% solution of sodium hydroxide are mixed together and the resulting pH is about 5. 126 parts (1 mol) of melamine is added and the mixture is heated until a temperature of about 90° C. is reached. Thereafter, a solution of 14.1 parts of 2-aminoethylsulfuric acid (0.1 mol) in 49 parts of a 10% aqueous solution in sodium hydroxide is introduced and the reaction mixture is maintained at reflux for about 10 minutes, and is then cooled to room temperature. The resultant product has a pH of 7.3 and is infinitely soluble in water.

EXAMPLE 7

126 parts (1 mol) of melamine and 162 parts of a 37% aqueous solution of formaldehyde (2 mols) are mixed together and the pH of the slurry is adjusted to about 7 with dilute sodium hydroxide. The mixture is slowly heated to reflux and maintained at that temperature for about 7 minutes. The solution is then cooled to about 65° C. and a solution of 11.3 parts of 2-aminoethylsulfuric acid (0.08 mol), 32 parts of a 10% aqueous solution of sodium hydroxide and 63.3 parts of water are added. The reaction is further carried out by heating at 55°–60° C., for about 30 minutes. The product is then cooled to room temperature. It is soluble in water forming a slightly hazy solution.

EXAMPLE 8

1260 parts of melamine (10 mols) and 2676 parts of a 37% aqueous solution of formaldehyde (33 mols) are introduced into a suitable reaction chamber and thoroughly mixed together. The pH of the mixture is adjusted to about 7–8 with 1.2 parts of a 10% aqueous solution of sodium hydroxide. The mixture is heated to about 80° C. and maintained at 80–85° C. for about 10 minutes. A solution of 113 parts of 2-aminoethylsulfuric acid (0.8 mol) in 320 parts of a 10% aqueous solution of sodium hydroxide (0.8 mol) and 100 parts of water is added and the reaction is continued at about 55°–60° C. for 15 minutes. The reaction mixture is then cooled to room temperature. The syrup is then spray dried and the resultant powderous material may be redissolved in cold water.

EXAMPLE 9

2772 parts of melamine (22 mols) and 5888 parts of a 37% aqueous solution of formaldehyde (72.6 mols) are mixed together in a suitable reaction chamber and the pH of the mixture is adjusted to about 7–8 by the addition of 2.7 parts of a 10% aqueous solution of sodium hydroxide. The mixture is warmed to 80° C. and maintained at that temperature for about 10 minutes. The reaction is then retarded by adding 151 parts of a 10% aqueous solution of NaOH. A solution of 248 parts of 2-aminoethylsulfuric acid (1.76 mols) in 704 parts of a 10% aqueous solution of NaOH is added to the reaction vessel and the reaction mixture is immediately cooled down to room temperature which is reached in about 30 minutes. The syrup, with its pH adjusted to 10.5 by the addition of 325 parts of a 29% aqueous solution of ammonia, is spray dried. The resultant dry powder is soluble in cold water.

EXAMPLE 10

126 parts of melamine (1 mol) and 243 parts of a 37% aqueous formaldehyde solution are mixed together and the pH of the slurry is adjusted to about 7. The mixture is heated to 80° C. in about 20 minutes and maintained at about 80–85° C. for about 30 minutes. It is then cooled to about 50° C. and a solution consisting of 21.2 parts of 2-aminoethylsulfuric acid (0.15 mol) and 4 parts of sodium hydroxide is added. The pH of the reaction mixture drops to about 6. Reaction is continued at 45–55° C. at this pH. The viscosity of the resin gradually increases while the resin is being maintained at this temperature. After about 75 minutes, the resin syrup is neutralized with a dilute sodium hydroxide solution and cooled to room temperature. The resultant resin syrup has a viscosity of J on the Gardner-Holdt scale at 25° C. and is infinitely soluble in water.

EXAMPLE 11

The resin syrup described in Example 1 is diluted with water to a resin concentration of 10%. Ammonium chloride in the amount of 3.5% by weight based on the total weight of the resin solids is added to the solution as a curing accelerator. A piece of 8 oz. woolen flannel wear is impregnated in the solution for 1 minute and squeezed to a wet pick up of 100% of the weight of the dry cloth. It is then dried and cured in an air oven maintained at 290° F. for 9 minutes. The treated flannel after five 10-minute washes according to Fed. Specification for Textiles C. C. C. T. 191 A shows a shrinkage of 4.4%, whereas an untreated flannel after the same washes shows a shrinkage of about 15%.

EXAMPLE 12

A number of the resins described in the above examples are used to treat 80 x 80 cotton cloth. The impregnating bath is prepared by dissolving the resins in water to a 10% concentration. A curing accelerator is added to the solution. Cloth samples are bathed in the resin bath, dried and cured in a hot air oven. Two heat conditions are used depending on the curing accelerator employed. When a phosphate is used, the samples are heated at 290° F. for 6 minutes. When a hydrochloride is used, the samples are heated at 225° F. for 5 minutes and at 350° F. for 1½ minutes. The cloth samples are evaluated for their shrinkage control and crease resistance. Shrinkage is measured after the cloth samples are washed in water at 160° F. containing 0.1% by weight of soap and 0.1% by weight of soda ash. Each wash lasts about 1 hour. A thorough rinse at 160° F. follows each wash. Tests for crease resistance are made according to the Tootal-Broadhurst-Lee Co. method. These tests are accomplished after the samples are washed for 5 minutes in water at 160° F. containing 0.1% soap and 0.1% soda ash. The results of these tests are shown hereinbelow in the table.

polymerization is desired, the use of a pH lower than 7 will be advantageous.

The reaction temperature and time of reaction are closely interrelated. In general, higher reaction temperatures and lengthy reaction periods tend to increase the degree of polymerization.

*Table—Resin treatment of 80 x 80 cotton cloth*

| Resin described in Example | Curing Accelerator, Wt. Percent Resin Solids | Resin Solids Applied, Wt. Percent of Cloth | Percent Warp Shrinkage After— | | Total TBL Crease Resistance |
|---|---|---|---|---|---|
| | | | 1 wash | 3 washes | |
| 2 | 3.5% diammonium phosphate. | 9.6 | 1.4 | 1.9 | 5.9 |
| 4 | do | 8.6 | 1.7 | 2.5 | 5.6 |
| 7 | 5% triethanolamine hydrochloride. | 10.1 | 1.7 | 2.2 | 5.5 |
| 8 | 7% triethanolamine hydrochloride. | 9.0 | 1.1 | 1.7 | 5.9 |
| 8 | 7% morpholine hydrochloride. | 9.4 | 1.4 | 1.7 | 6.5 |
| 8 | 5% 2-amino-2-methyl-propanol-1-hydrochloride. | 8.7 | 0.8 | 1.4 | 6.2 |
| 9 | 7% triethanolamine hydrochloride. | 9.3 | 1.7 | 2.2 | 5.2 |
| None | | | 5.8–6.9 | 7.2–8.0 | 3.3–3.8 |

EXAMPLE 13

Hand sheets were prepared on the Nash Sheet Machine according to a conventional process in which unbleached Canadian kraft pulp was used throughout with about 3% of alum and 3% of the resin prepared according to Example 10 (on a resin solids basis) said percentages being by weight based on the weight of the fiber. The sheet having a basis weight of 45.8 lbs. (25" x 40" x 500) after being dried and cured at 240° F. for 2 minutes has a wet strength of 4.4 lbs./in. With an extra cure of 260° F. for 10 minutes, the wet strength increases to 5.2 lbs./in. A control sheet without the resin treatment has a wet strength of only 0.5 lbs./in.

In the preparation of the modified melamine-formaldehyde resin, one may use mol ratios of melamine to formaldehyde varying between 1:2 and 1:5, respectively, but preferably between 1:2.5 and 1:3.5, respectively. The mol ratio of the aminoalkylsulfuric acid compound to melamine may vary between about 0.03:1 to 0.5:1, respectively, but preferably between about 0.05 to 0.3:1, respectively. Although the aminoalkylsulfuric acid per se may be used in the reaction, it is preferred that the acid be neutralized before it is added to the reaction mixture by the addition of such materials as sodium hydroxide, potassium hydroxide, ammonium hydroxide and water soluble amines.

The order of addition of the reactant to the reaction vessel is not material, but it is preferred to react the melamine and formaldehyde before adding the aminoalkylsulfuric acid compound. However, the melamine, formaldehyde and aminoalkylsulfuric acid compound may be reacted together or the formaldehyde and the aminoalkylsulfuric acid compound may be reacted first before adding the melamine.

The pH of the reaction mixture may be controlled over a fairly wide range such as between about 4 and 11, but preferably between about 6–8. At the low pH's, the polymerization of the resin may develop very rapidly whereas at the higher pH's, the pH may drop during the reaction, especially when the aminoalkylsulfuric acid compound is present. If a product of low degree of polymerization is desired, a pH above 7 should be used. If a product of high degree of Temperatures between 45–100° C. are most desirable for all practical purposes. At temperatures appreciably below 45° C. the reaction would proceed but too slowly. After the initial condensation of melamine and formaldehyde, higher temperatures would greatly accelerate the rate of polymerization. For textile treatment, a resin of low degree of polymerization gives a softer "hand" to the fabric. However, as a permanent stiffener for textile fabrics or as a wet strength paper resin applied by beater addition, a resin of high degree of polymerization is preferred. One may stop the reaction process at any given point which should be determined by the properties which are desired in the ultimate product which can be determined best by knowledge of its ultimate use. When in the course of the reaction it becomes necessary to adjust the pH, one may make use of conventional bases such as sodium hydroxide, sodium carbonate, triethanolamine, triethylamine, borax and the like or by the addition of acids such as formic, acetic, lactic, and the like.

When the resinous material has been prepared and is about to be used in a given application, it is generally desirable to add to the solution of the resinous material a curing accelerator and in this connection any of the conventional acid releasing compounds may be used. One may use, for instance, ammonium chloride, ammonium sulfate, diammonium phosphate, triethanolamine hydrochloride, triethanolamine phosphate, guanidine hydrochloride and the like. The resins of the present invention are useful not only for the purpose of treating textiles but are additionally useful in the treatment of paper to produce wet strength paper, as a tanning or plumping agent in leather treatment, for laminating purposes and as adhesives amongst other things.

It has been set forth hereinabove that the modifier for the melamine-formaldehyde resin should be an aminosulfuric acid or derivative thereof having the formula: $NH_2(CH_2)_nOSO_3X$, wherein the letter $n$ signifies a whole number between 1 and 6, inclusive, and X designates a radical selected from the group consisting of H, Na, Li, $NH_4$, and hydrogen in combination with water soluble tertiary amines, such as triethylamine, trimethylamine, triethanolamine, and the like. Amongst that group are such compounds as aminomethylsulfuric acid, 2-aminoethylsulfuric acid, 3-aminopropylsulfuric acid, 4-aminobutyl sulfuric acid, 5-aminoamylsulfuric acid, and 6-aminohexylsulfuric acid and the salts thereof. It is preferred that the amino group and the sulfuric acid or salt group be attached to the two end carbon atoms.

I claim:

1. A process for preparing a water soluble melamineformaldehyde resin comprising reacting at elevated temperatures melamine, formaldehyde and a compound having the general formula: $NH_2(CH_2)_nOSO_3X$, wherein $n$ is a whole number between 1 and 6, inclusive, and X is a member selected from the group consisting of H, Li, K, Na, $NH_4$ and hydrogen in combination with a water soluble tertiary amine and, wherein the mol ratios of the reactants are 1:2:0.03 to 1:5:0.5, respectively.

2. A process for preparing a water soluble melamineformaldehyde resin comprising reacting 2-5 mols of formaldehyde with 1 mol of melamine, thereafter adding 0.03-0.5 mol per mol of melamine, of a compound having the general formula: $NH_2(CH_2)_nOSO_3X$, wherein $n$ is a whole number between 1 and 6, inclusive, and X is a member selected from the group consisting of H, Li, K, Na, $NH_4$ and hydrogen in combination with a water soluble tertiary amine, and heating the reaction mixture.

3. A process for preparing a water soluble melamineformaldehyde resin comprising reacting 2.5-3.5 mols of formaldehyde with 1 mol of melamine, thereafter adding 0.05-0.3 mol per mol of melamine of a compound having the general formula: $NH_2(CH_2)_nOSO_3X$, wherein $n$ is a whole number between 1 and 6, inclusive, and X is a member selected from the group consisting of H, Li, K, Na, $NH_4$ and hydrogen in combination with a water soluble tertiary amine and heating the reaction mixture.

4. A process for preparing a water soluble melamineformaldehyde resin comprising reacting 2.0-5.0 mols of formaldehyde per mol of melamine at a pH of 4-11 at a temperature between 45-100° C., adding thereto 0.03-0.5 mol per mol of melamine, of a compound having the general formula: $NH_2(CH_2)_nOSO_3X$, wherein $n$ is a whole number between 1 and 6, inclusive, and X is a member selected from the group consisting of H, Li, K, Na, $NH_4$ and hydrogen in combination with a water soluble tertiary amine and reacting said mixture to produce a water soluble resin.

5. A process for preparing a water soluble melamineformaldehyde resin comprising reacting 2.0-5.0 mols of formaldehyde per mol of melamine at a pH of 6-8 at a temperature between 45-100° C., adding thereto 0.03-0.5 mol per mol of melamine, of a compound having the general formula: $NH_2(CH_2)_nOSO_3X$, wherein $n$ is a whole number between 1 and 6, inclusive, and X is a member selected from the group consisting of H, Li, K, Na, $NH_4$ and hydrogen in combination with a water soluble tertiary amine and reacting said mixture to produce a water soluble resin.

6. A composition of matter comprising a water soluble reaction product of melamine, formaldehyde and a compound having the general formula: $NH_2(CH_2)_nOSO_3X$, wherein $n$ is a whole number between 1 and 6 inclusive, and X is a member selected from the group consisting of H, Li, K, Na, $NH_4$, and hydrogen in combination with a water soluble tertiary amine and, wherein the mol ratios of the reactants are 1:2:0.03 to 1:5:0.5, respectively.

7. A composition of matter comprising a water soluble reaction product of melamine, formaldehyde and a compound having the general formula: $NH_2(CH_2)_nOSO_3X$, wherein $n$ is a whole number between 1 and 6, inclusive, and X is a member selected from the group consisting of H, Li, K, Na, $NH_4$ and hydrogen in combination with a water soluble tertiary amine and wherein the mol ratios of the reactants are 1:2.5:0.05 to 1:3.5:0.3, respectively.

8. Textile material impregnated with the reaction product of claim 5.

9. Textile material impregnated with the reaction product of claim 6.

10. A textile material impregnated with 1-20% of the reaction product of melamine, formaldehyde and a compound having the general formula: $NH_2(CH_2)_nOSO_3X$, wherein $n$ is a whole number between 1 and 6 inclusive, and X is a member selected from the group consisting of H, Li, K, Na, $NH_4$ and hydrogen in combination with a water soluble tertiary amine and, wherein the mol ratios of the reactants are 1:2:0.03 to 1:5:0.5, respectively.

11. A fibrous cellulosic material impregnated with the reaction product of claim 6.

12. A fibrous cellulosic material impregnated with the reaction product of claim 7.

13. A fibrous cellulosic material impregnated with 1%-10% of the reaction product of melamine, formaldehyde and a compound having the general formula: $NH_2(CH_2)_nOSO_3X$, wherein $n$ is a whole number between 1-6, inclusive, and X is a member selected from the group consisting of H, Li, K, Na, $NH_4$, and hydrogen in combination with a water soluble tertiary amine and wherein the mol ratios of the individual components are between 1:2:0.03 and 1:5:0.5, respectively.

14. A composition of matter comprising a water soluble reaction product of (1) a neutral to alkaline condensate of 1 mol of melamine with between 2 and 5 mols of formaldehyde and (2) between 0.05 and 0.5 mols of the sodium salt of 2-amino ethyl sulfuric acid.

15. A composition of matter comprising a water soluble reaction product of (1) a neutral to alkaline condensate of 1 mol of melamine with between 2 and 5 mols of formaldehyde and (2) between 0.05 and 0.5 mol of the potassium salt of 2-aminoethyl sulfuric acid.

16. A composition of matter comprising a water soluble reaction product of (1) a neutral to alkaline condensate of 1 mol of melamine with between 2 and 5 mols of formaldehyde and (2) between 0.05 and 0.5 mol of the ammonium salt of 2-aminoethyl sulfuric acid.

17. A composition of matter comprising a water soluble reaction product of (1) a neutral to alkaline condensate of 1 mol of melamine with between 2 and 5 mols of formaldehyde and (2) between 0.05 and 0.5 mol of the lithium salt of 2-aminoethyl sulfuric acid.

18. A textile material impregnated with 1-20% of a water soluble reaction product of (1) a neutral to alkaline condensate of 1 mol of melamine with between 2 and 5 mols of formaldehyde and (2) between 0.05 and 0.5 mol of the sodium salt of 2-aminoethyl sulfuric acid.

19. A fibrous cellulosic material impregnated with 1%-10% of a water soluble reaction product of (1) a neutral to alkaline condensate of 1 mol of melamine with between 2 and 5 mols of formaldehyde and (2) between 0.05 and 0.5 mol of the sodium salt of 2-aminoethyl sulfuric acid.

No references cited.